United States Patent [19]

Franklin

[11] 4,274,172

[45] Jun. 23, 1981

[54] RAMPS

[75] Inventor: Leslie C. Franklin, Hitchin, England

[73] Assignee: Ratcliff Tail Lifts Limited, Hertfordshire, England

[21] Appl. No.: 23,314

[22] Filed: Mar. 23, 1979

[30] Foreign Application Priority Data

Mar. 29, 1978 [GB] United Kingdom ............... 12312/78

[51] Int. Cl.³ .............................................. E01D 1/00
[52] U.S. Cl. ..................................... 14/69.5; 414/537
[58] Field of Search ....................... 414/537, 538, 558; 14/71.1, 71.3, 71.7, 69.5

[56] References Cited

U.S. PATENT DOCUMENTS

| 3,138,272 | 6/1964 | Flowers | 414/537 |
| 3,369,679 | 2/1968 | Robinson | 414/558 |

Primary Examiner—Robert G. Sheridan
Attorney, Agent, or Firm—Young & Thompson

[57] ABSTRACT

A platform and ramp apparatus comprises a ramp and structure for securing the ramp to the platform. The securing means comprises link structure rotatably mounted on the platform to rotate about a first axis of rotation fixed relative to the platform, the ramp being rotatably mounted on the linkage to rotate about a second axis of rotation parallel to the first axis of rotation. Engagement structure is provided on the platform and on the ramp respectively, which engagement structure is capable of retaining the ramp in two alternative positions relative to the platform. These are a first ramp position in which the ramp provides a surface sloping downwardly from the platform and a second ramp position in which the ramp provides a surface sloping upwardly from the platform to form a barrier. Rotation of the linkage about the first axis of rotation allows disengagement of the engagement structure whereby the ramp may be moved between the first and second ramp positions.

16 Claims, 8 Drawing Figures

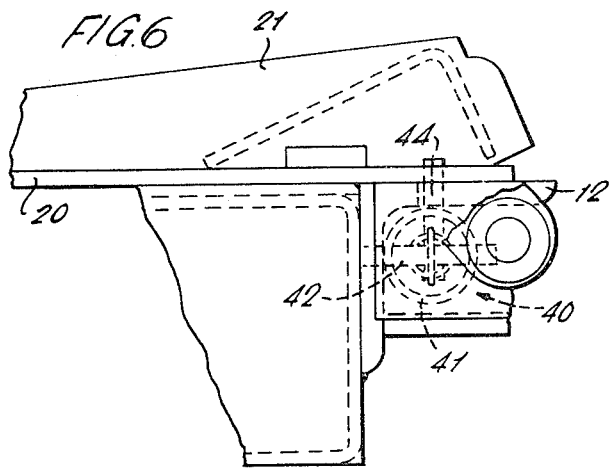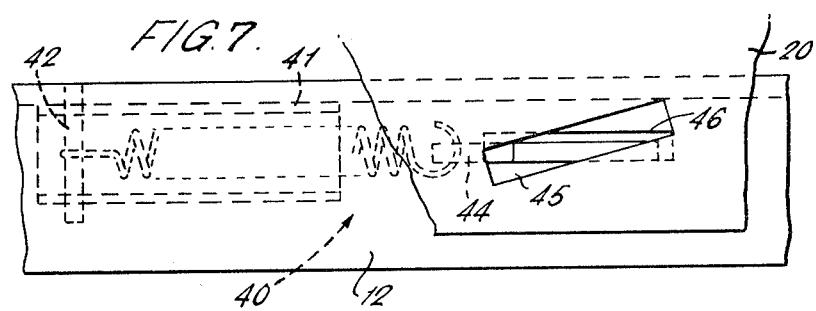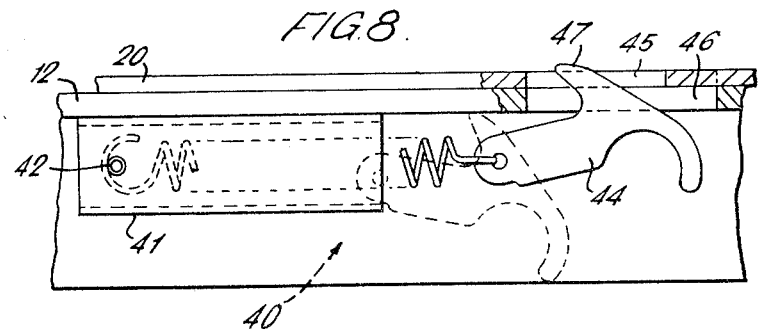

RAMPS

BACKGROUND TO THE INVENTION

The invention relates to platform ramps, and more particularly but not exclusively to ramps for use on platforms of load lifting and lowering apparatus, for example vehicle tail lifts.

SUMMARY OF THE INVENTION

According to the invention there is provided a platform, e.g. a lifting and lowering platform of a vehicle, and ramp apparatus comprising a ramp and means for securing the ramp to the platform, the securing means comprising link means rotatably mounted on the platform to rotate about a first axis of rotation fixed relative to the platform, the ramp being rotatably mounted on the link means to rotate about a second axis of rotation parallel to the first axis of rotation, engagement means being provide on the platform and on the ramp respectively, which engagement means are capable of retaining the ramp in two alternative positions relative to the platform, a first ramp position in which the ramp provides a surface sloping downwardly from the platform and a second ramp position in which the ramp provides a surface sloping upwardly from the platform to form a barrier, rotation of the link means about the first axis of rotation allowing disengagement of the engagement means whereby the ramp may be moved between the first and the second ramp positions.

The ramp is preferably movable to a third position by rotation of the ramp about the second axis of rotation from the second ramp position away from the first ramp position and by rotation of the link members about the first axis of rotation, in which third ramp position the ramp lies parallel to and against the platform.

Abutment means may be provided on the ramp to be engageable with the link means, the arrangement being such that when the ramp is rotated about the second axis of rotation from the second ramp position towards the third ramp position, the abutment means engages the link means to cause the link means to rotate about the first axis of rotation. Locking means may be provided to lock the ramp in the third ramp position.

The link means preferably comprises at least two link members, each link member preferably being rotatably mounted on a pin secured to the platform. The link members are preferably connected by a rod, and the longitudinal axis of the rod may be the same as the second axis of rotation. The ramp may be mounted for rotation on the connecting rod.

In the first ramp position, the ramp may be angled at between 0° and 30° and preferably at 20° to the horizontal.

In the second ramp position, the ramp is preferably angled at between 60° and 90° to the platform, the preferred angle being 65°.

The cam means preferably has a first and a second engagement portions and a curved profile portion between the two engagement portions, the first engagement portion being for engagement with the stop means when the ramp is in the first ramp position and the second engagement portion being for engagement with the stop means when the ramp is in the second ramp position.

By way of example, one embodiment of a platform and ramp apparatus and a modification thereto according to the invention will now be described with reference to the accompanying drawings.

BRIEF DESCRIPTION OF THE DRAWINGS

FIGS. 6, 7 and 8 show ramp apparatus modified to include a second embodiment of a ramp locking device.

DESCRIPTION OF THE PREFERRED EMBODIMENT

Figure 1:
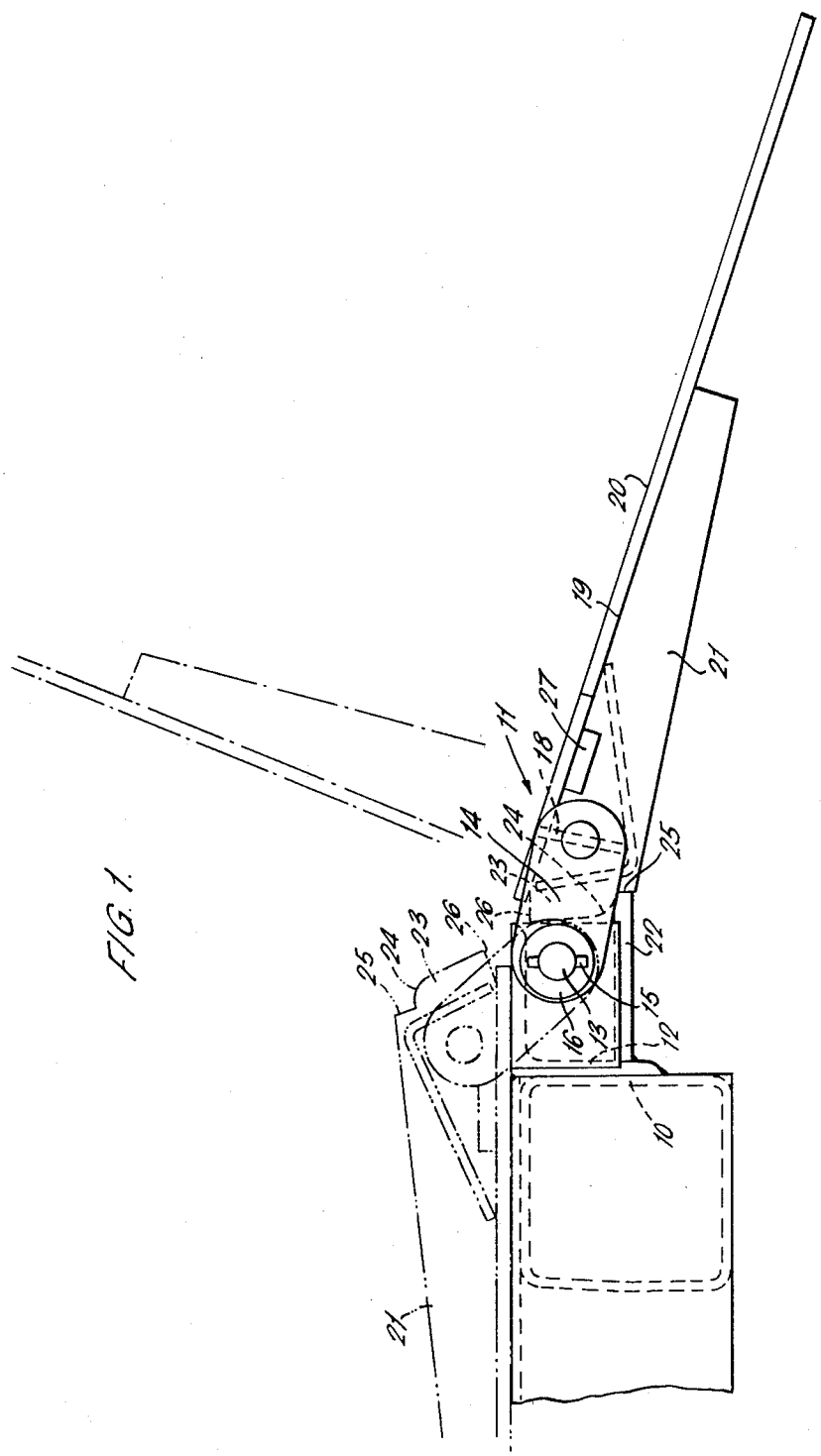
FIG. 1 is a side view of a platform and ramp apparatus.

FIG. 1 shows an end portion of a platform 10 being, for example, a lifting and lowering platform of a vehicle. To the platform 10 is secured ramp apparatus generally indicated at 11.

An elongate, metal bracket 12 is rigidly secured to the platform 10, the bracket 12 extending forwardly with respect to the platform. Two metal stub pins 13 are rigidly and coaxially secured to the bracket 12, one stub pin 13 being secured at each end of the bracket 12. A metal link member 14 is rotatably mounted on each stub pin, each link member 14 being held on the associated stub pin by a locking pin 15. A washer 16 is interposed between each locking pin 15 and the associated link member 14. The link members are thus rotatable about a first axis which is fixed relative to the platform 10. The fixed axis will be herein referred to as the first rotational axis.

The link members 14 are connected to each other by a connecting rod 17 which is locked to each link member 14 by a locking pin 18.

A ramp 19 of metal or other suitable material has a ramp surface 20 and a pair of plate members 21 rigidly secured to the side of the ramp away from the ramp surface 20. The connecting rod 17 passes through holes in the plate members 21 so that the ramp is rotatable about the connecting rod 17, thereby defining a second axis of rotation of the ramp, the second rotational axis being parallel to the first rotational axis.

An elongate extension portion serving as an engagement member 22 extends below and outwardly from the bracket 12. The plate members 21 are formed with an end portion 23 having a cam profile to provide engagement means engageable with the engagement member 22 to retain the ramp 19 in two alternative ramp positions. The cam profile has first and second engagement portions 25 and 26 and a rounded portion 24. Engagement of the cam surface on the engagement member 22 enables the ramp to be retained either in a first ramp position in which the first cam engagement portion 25 of the cam profile engages the engagement member 22 and the ramp surface 20 slopes downwardly from the platform 10, or in a second ramp position in which the second cam engagement portion 26 engages the engagement member 22 and the ramp surface 20 slopes upwardly from the platform to provide a barrier, for example, to prevent articles sliding off the platform.

Figure 2:
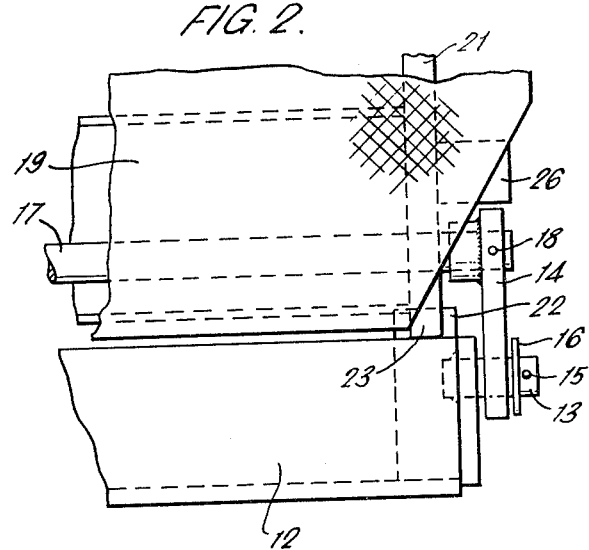
FIG. 2 is a view from above of a part of the apparatus of FIG. 1.
Figure 3:
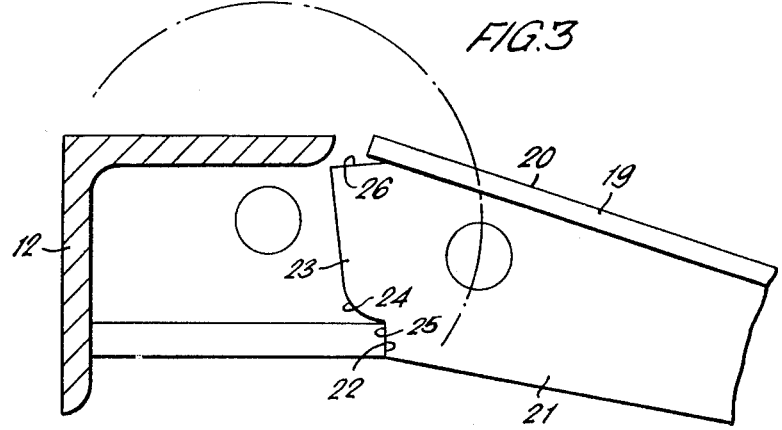
FIG. 3 is a diagrammatic representation of the ramp apparatus in a first position acting as a ramp.

As shown in FIG. 2, a corner portion of the ramp 19 is removed so that rotation of the ramp about the second rotational axis will not cause engagement between the ramp 19 and the link members 14. A corner portion adjacent each link member 14 is removed. To the side of the ramp away from the ramp surface 20 are secured abutment members 27. When the ramp is rotated sufficiently about the connecting link 17, the abutment members 27 will engage the associated linking members so that further rotation of the ramp towards a third ramp position in which the ramp lies against the platform is possible by rotation of the ramp 19 and link members 14 about the first rotational axis as shown in FIG. 1.

A locking device is provided, which device is operable to secure the ramp in the third position. An embodiment of a locking device will now be described, as is generally shown at 40 in FIGS. 7, 8 and 9. The device 40 comprises a metal tube 41 welded to the bracket 12 and a pin 42 extending through the bracket 12 and tube 41. One end of a spring 43 is hooked over the pin 42 and the spring 43 extends through the tube 41. A hook 44 is rotatably secured to the other end of the spring 43, and the length of the spring is such that the hook is urged towards the pin 42, there being tension in the spring even when the hook is in a retracted position abutting the tube 41 (as shown in dotted lines in FIG. 9). A slot 45 is formed in the ramp 20 at an oblique angle to the axis of the tube 41, and a slot 46 is formed in the bracket 12 parallel to the axis of the tube 41. When it is desired to secure the ramp 20 in the third position, the hook 45 is manually pulled upwardly and away from the pin 42 so that projection 47 engages both slots 45 and 46 to prevent any movement of the ramp towards the second position. When it is desired to release the ramp, the hook 44 is returned to the retracted position.

In a modification of the embodiment shown in FIGS. 7, 8 and 9, a longitudinal slot in the bracket 12 only is required. In that case, the slot is formed in that part of the bracket 12 not covered by the ramp 20 when in the third position. The slot is arranged at an oblique angle to the edge of the ramp 20 when in the third position so that when the hook 44 is engaged in the slot the hook is urged into engagement with the ramp edge by spring tension, thereby preventing movement of the ramp from its third position. This modification has the advantage that no slot is required in the ramp 20.

Figure 4:
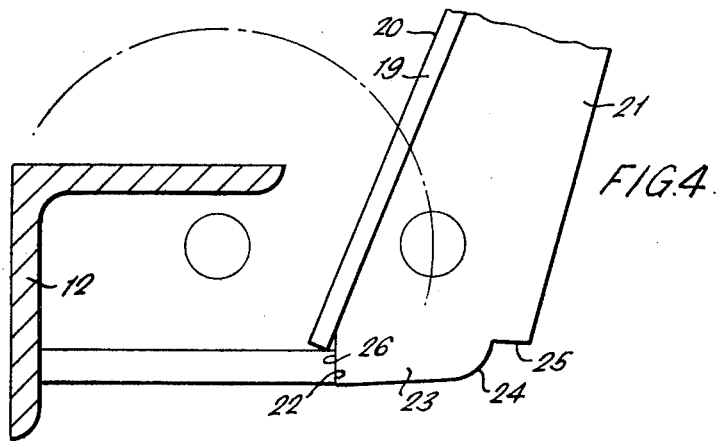
FIG. 4 is a diagrammatic representation of the ramp apparatus in a second position acting as a barrier.

Motion of the ramp 19 will now be described in more detail with reference to diagrammatic FIGS. 4, 5 and 6. FIG. 4 shows the first ramp position in which the first engagement portion 25 of the cam profile engages the engagement member 22. In the first ramp position, the ramp surface 20 slopes downwardly from the platform at an angle of approximately 20° to the horizontal. If, for example, on uneven ground, the end of the ramp 19 is raised, rotation of the ramp will occur about the second rotational axis so that the first engagement portion 25 of the cam profile is disengaged from member 22, and the curved portion 24 of the cam profile is brought into engagement with the engagement member 22. Since the curved portion of the cam profile is shaped so that the distance between the second axis of rotation and the cam surface becomes greater as the second engagement portion 26 is approached, rotation of the ramp away from the first ramp position will cause rotation of the link members about the first axis of rotation.

Figure 5:
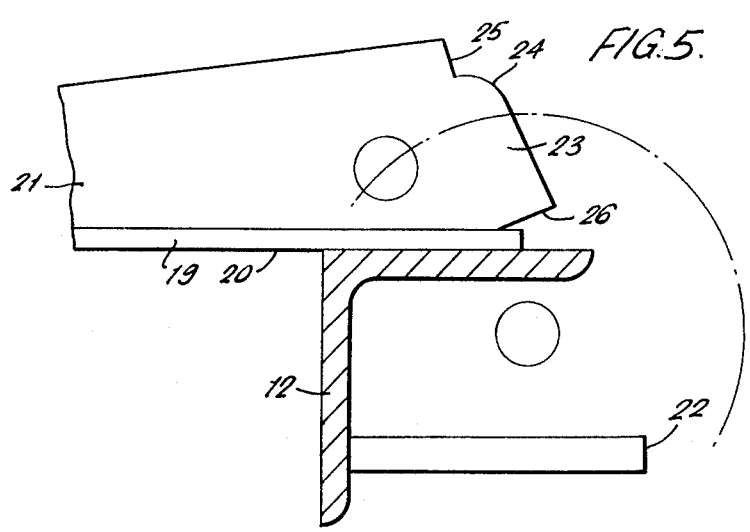
FIG. 5 is a diagrammatic representation of the ramp apparatus in a third and closed position.

As further rotation of the ramp away from the first ramp position occurs, the cam profile causes further rotation of the link members about the first axis of rotation until the second engagement portion 26 engages the engagement member 22 and the second ramp position is reached (FIG. 5). In the second ramp position, the ramp surface 20 slopes upwardly at approximately 25° to the vertical.

In order to move the ramp from the second ramp position to the first ramp position, the second cam engagement portion 26 must first be disengaged from the engagement member 22 by rotation of the link members about the first axis of rotation, by for example lifting the ramp bodily upwards.

Further rotation of the ramp from the second ramp position away from the first ramp position causes engagement of the abutment members 27 with the associated link members 14 and consequent rotation of the link members 14 about the first axis of rotation until the third ramp position is reached (FIG. 6).

The ramp apparatus 11 is preferably secured to a platform by welding, no cut outs, slots, holes or recesses being required.

Advantages of this embodiment of the invention are that when the ramp is in the first ramp position, there are no projections above the platform or ramp surfaces and that there are no holes of a size which could impede, for example, a small castor, that two units can conveniently be placed side by side on a wide platform to produce the equivalent of a single ramp, and that as the ramp is connected to the platform via connected links, the ramp is easy to operate and will not jam.

I claim:

1. A platform and ramp apparatus comprising a ramp and means for securing the ramp to the platform, the securing means comprising link means rotatably mounted on the platform to rotate about a first axis of rotation fixed relative to the platform, the ramp being rotatably mounted on the link means to rotate about a second axis of rotation parallel to the first axis of rotation, stop means being provided on the platform and engagement means being provided on the ramp, which engagement means comprise a first engagement portion and a second engagement portion, the first engagement portion engaging the stop means to define a first ramp position in which the ramp provides surface sloping downwardly from the platform, and the second engagement portion engaging the stop means to define a second ramp position in which the ramp provides a surface sloping upwardly from the platform to form a barrier, rotation of the link means about the first axis of rotation allowing disengagement of the stop means and engagement means whereby the ramp may be moved between the two ramp positions.

2. A platform and ramp apparatus as claimed in claim 1 in which the ramp is movable to a third ramp position by rotation of the ramp about the second axis of rotation from the second ramp position away from the first ramp position and by rotation of the link members about the first axis of rotation, in which third ramp position the ramp lies parallel to and against the platform.

3. A platform and ramp apparatus as claimed in claim 2 wherein abutment means are provided on the ramp to be engageable with the link means, whereby when the ramp is rotated about the second axis of rotation from the second ramp position towards the third ramp position, the abutment means engages the link means to cause the link means to rotate about the first axis of rotation.

4. A platform and ramp apparatus as claimed in claim 1 wherein the engagement portions are provided by cam means on the ramp, the cam means having a curved profile portion between the two engagement portions, which curved profile portion is engageable with the stop means of the platform when the ramp is moved between the two ramp positions.

5. A platform and ramp apparatus as claimed in claim 2 or claim 3 in which locking means are provided to lock the ramp in the third ramp position.

6. A platform and ramp apparatus as claimed in claim 5 wherein the locking means comprise hook means engageable in a slot in the platform extending obliquely to the axes of rotation of the ramp and resilient means to urge the hook means towards one end of the slot, the arrangement being such that the hook means is urged along the slot into engagement with the ramp to lock the ramp in the third ramp position.

7. A platform and ramp apparatus as claimed in claim 6 wherein a slot is formed in the ramp at an oblique angle to the slot in the platform, the hook means being engageable in both slots to lock the ramp in the third ramp position.

8. A platform and ramp apparatus as claimed in claim 6 wherein the resilient means is a spring.

9. A platform and ramp apparatus as claimed in claim 1 in which the link means comprises at least two link members.

10. A platform and ramp apparatus as claimed in claim 9 in which each link member is rotatably mounted on a pin secured to the platform.

11. A platform and ramp apparatus as claimed in claim 9 in which the link members are connected to one another by a rod.

12. A platform and ramp apparatus as claimed in claim 11 in which the ramp is mounted for rotation on the connecting rod, the longitudinal axis of the connecting rod being the second axis of rotation of the ramp.

13. A platform and ramp apparatus as claimed in claim 1 in which the ramp is angled at between 0° and 30° to the horizontal in the first ramp position.

14. A platform and ramp apparatus as claimed in claim 13 in which the ramp is angled at 20° to the horizontal in the first ramp position.

15. A platform and ramp apparatus as claimed in claim 1 in which the ramp is angled at between 60° and 90° to the vertical in the second ramp position.

16. A platform and ramp apparatus as claimed in claim 15 in which the ramp is angled at 65° to the vertical in the second ramp position.

* * * * *